Patented Mar. 30, 1937

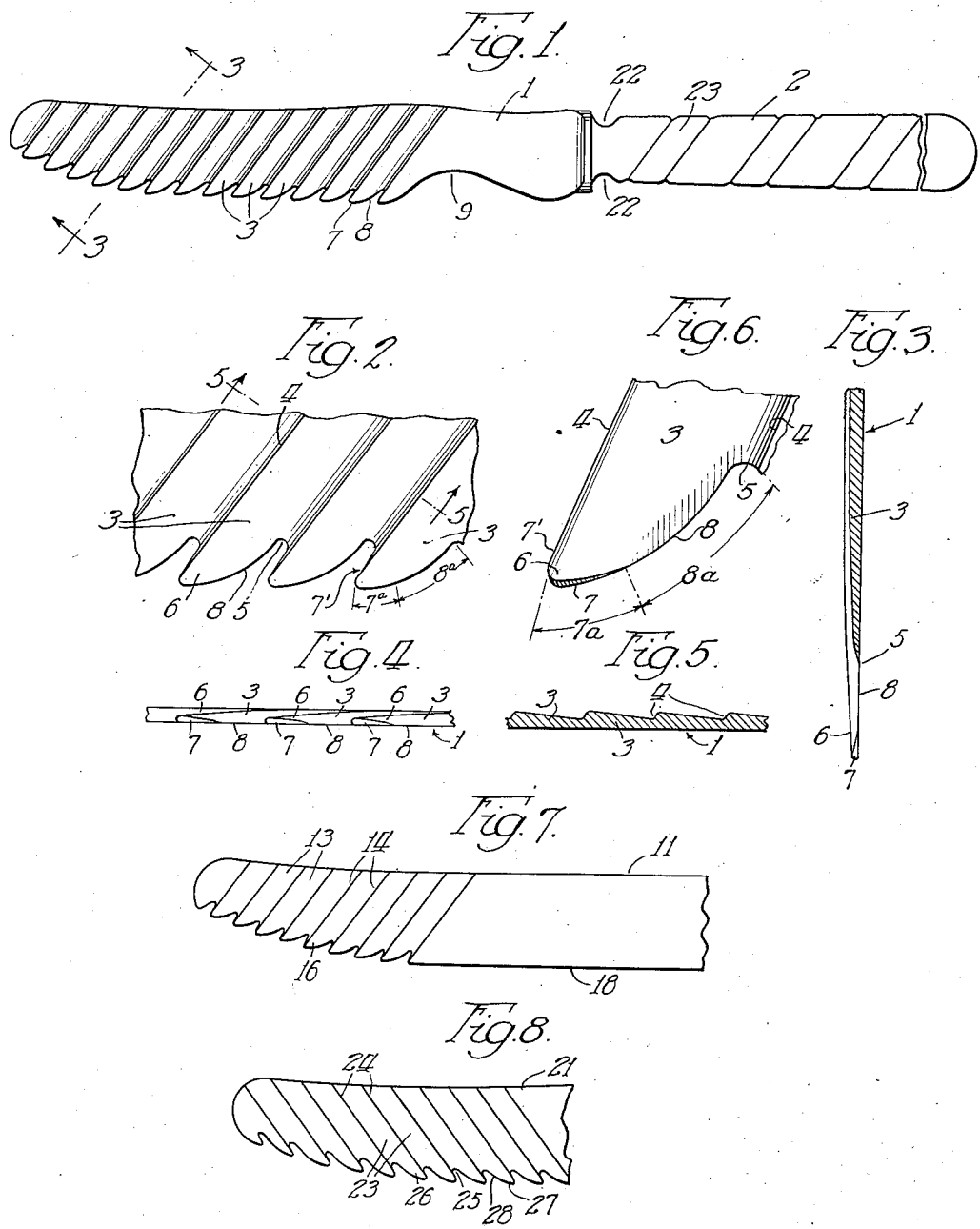

2,075,310

UNITED STATES PATENT OFFICE 2,075,310

KNIFE

Edward Sprague, Jr., Chicago, Ill., assignor, by direct and mesne assignments, of one-third to Grace L. Arthur and one-third to Pearl C. Dolan, both of Chicago, Ill.

Application March 25, 1935, Serial No. 12,805

2 Claims. (Cl. 30—9)

My invention belongs to that general class of devices known as knives and more particularly to what might be called a safety table knife, particularly one adapted for cutting meats and such other material as may be found suitable. The use of the same, however, is not confined to table use, this being particularly mentioned because while the knife is extremely keen and sharp, yet the same is so constructed that it is entirely safe for handling and use even by children without danger of accident.

The invention has among its objects the production of a knife of the kind described that is simple, convenient, efficient, inexpensive, attractive in appearance and applicable for use wherever the same may be found suitable.

The invention has among its further objects the production of a knife construction in which the cutting edge is substantially sharp and keen for cutting purposes at the table or in the kitchen but which, on the other hand, may be satisfactorily and safely handled or cleaned in the same manner that the ordinary substantially dull table knife may be handled and without the slightest danger of injury.

More particularly the invention has as an object the production of a knife blade which is constructed to provide substantially a plurality or series of associated integrally connected knife blades, each of which is extremely sharp but which is guarded by the adjacent individual blade to which it is integrally connected.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawing, wherein like reference characters indicate like or corresponding parts:

Fig. 1 is a side elevation of a knife illustrating one embodiment of my invention;

Fig. 2 is an enlarged view of a portion of the same;

Fig. 3 is a section taken substantially on line 3—3 of Fig. 1 but enlarged;

Fig. 4 is a bottom or edge view of a portion of the blade;

Fig. 5 is a sectional view taken substantially on line 5—5 of Fig. 2;

Fig. 6 is a view of one of the blades considerably enlarged to more clearly show the construction;

Fig. 7 is a view similar to the blade shown in Fig. 1 in which only one end is formed as herein described; and Fig. 8 is a view similar to the portion of the individual blade shown in Fig. 1, except that the individual blades are operative when the knife is pushed rather than pulled.

Referring to the drawing, particularly Figs. 1 to 6. 1 generally represents a blade of a knife having a handle 2 either formed integrally with the blade or attached thereto as may be preferred. The blade 1 is of the desired size and general shape and is constructed to provide what may be described as a series of individual but integrally connected associated knives 3, the two edges of the same being indicated as at 4—4. These individual blades are substantially wedge-shaped, the thicker edge constituting substantially the back. These blades are integrally connected together, as mentioned, with the thin edge of one abutting the thick edge of the other, but each with an end projecting from each blade beyond the juncture with the adjacent blade. The length of the grooves deforming the blades may be as desired, and these are as shown preferably on one face only of the blade body. As shown, each individual blade extends as indicated at 6 to provide a pointed end somewhat similar to the end of a pen knife blade, for example, which extends back as indicated at 5. Adjacent the extreme point the same is preferably blunt or dull as indicated at 7 and the back edge 7' is also preferably dull. Extending from its juncture with the adjacent blade at 5 is the cutting edge portion 8, which extends a substantial distance toward the point of the individual blade, and which is very keen or sharp. This is accomplished by making the blade 3 what might be termed as wedge-shaped similar to the extremely sharp and dangerously keen butcher's knife. The blunt and sharpened areas are indicated at 7a and 8a, respectively, on Fig. 6. The sharpened edges being inwardly the line connecting the dulled or blunt ends, the knife may be safely handled and even drawn over the hand without the slightest danger of cutting or injuring the hand. It may be easily washed or cleaned and with perfect safety.

Owing to the necessity of securing strength at the juncture between the associated blades the reduced edge of each individual blade does not taper off as it does at the extreme end as it is necessary to leave enough material for a rigid connection with the back edge of the adjacent blade. This is shown in Fig. 5. Referring to Fig. 3, however, it will be noted that the cutting edge 8 extends from the back of the blade to the extreme edge, giving the wedge-shaped construction previously mentioned. In the embodiment of the invention illustrated in the drawing, the other face of the blade body is flat, the sharpened edge being at the flat side as most clearly shown in Figs. 3 and 4.

The construction shown in Fig. 7 is similar to that described except that the blade 11 in this instance is provided with only a limited number of individually formed blades 13 which may be disposed at either end of the blade, as illustrated at the free end, the handle not being shown. These are constructed as previously described with their junctures at 14 and their sharpened edge at 16, while the balance of the blade may be sharpened to a desired degree at 18.

In Fig. 8 a similar construction is shown in which 21 represents the blade, 23 the individual blades making up the series and joined together at 24. 25, 26, 27 and 28 indicate similar parts of the blade as the characters 5, 6, 7 and 8 in Fig. 2. It will be noted that the knife shown in Fig. 1 is intended to do its cutting by moving the same lengthwise following the handle. The blades are arranged in the construction shown in Fig. 8 so that this knife is designed to cut by pushing the blade in advance of the handle. Obviously, with either construction the cutting action is the same insofar as the knives are concerned. In the drawing these substantially individual blades extend at an inclination of approximately forty-five degrees to the center line of the blade, but it is obvious that this angle may be varied.

I have illustrated in Fig. 1 how the blade, if desired, may be slightly cut away as indicated at 9 so as to so distribute the weight of the knife that a desired balance is secured. I have also shown the handle cut in as indicated at 22 so that a guard is formed at the juncture of the handle and blade, and the handle may also be decorated or ornamented, for example, as indicated at 23, so as to afford a better grip on the same.

As was previously mentioned, these knives are primarily intended or designed for table use in lieu of the usual dull or sharp steak knife which while sharper than an ordinary table knife, nevertheless is not made so sharp as to be positively dangerous. With my knife it is possible to put a razor-sharp edge on the knife without any danger resulting from the use of the knife. It may be made of any suitable material, preferably stainless steel or other metal, such material being most suitable for the blade. If desired, the handle may be made a separate part of some other material such as are commonly used for the purpose such as bone, ivory, glass, etc. which, while ornamental, are not in any way a material adapted for cutting purposes. While I have referred to the knife as being particularly a meat knife, it is of course obvious that the same may be used for any other cutting purpose for which it may be found suitable.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a knife, a blade body constructed to substantially provide a series of wedge-shaped individual blades integral throughout and having dull back edge portions and continuous thin edge portions, said blades arranged edge to edge and extending transversely at an angle to the axis of the blade body, with the thin edge portion of one integrally joined to the back edge of the other, with the end of each one projecting beyond the juncture with the adjacent blade, the thin edge of each projecting blade portion being sharpened from adjacent its juncture with the dull back edge portion of the next adjacent blade to a point spaced back from a line connecting the ends of adjacent blades, the extreme end points being substantially dull.

2. In a knife blade of the kind described, a body part having a series of grooves in one side thereof extending transversely of the blade, said body part being cut back at one edge thereof adjacent the line of said grooves to provide a plurality of spaced individual knife portions between the lines of said grooves and projecting from one edge of said body part, each knife portion being sharpened at one edge thereof from adjacent the body part of said knife blade outwardly to a point spaced inwardly from the line of the extreme outer ends of said individual knife portions, each of said grooves having a relatively narrow substantially straight side terminating in the back edge of an individual blade, the opposite side of each of said grooves and the face of each of said individual blades extending at an angle to the plane of said body part to adjacent the relatively narrow substantially straight side of the next adjacent groove and the front edge of the next adjacent individual blade, respectively.

EDWARD SPRAGUE, Jr.